(12) United States Patent
King et al.

(10) Patent No.: US 9,289,795 B2
(45) Date of Patent: Mar. 22, 2016

(54) PRESSURIZATION COATING SYSTEMS, METHODS, AND APPARATUSES

(75) Inventors: Gordon L. King, Chandler, AZ (US); Don A. Patterson, Gilbert, AZ (US)

(73) Assignee: PRECISION COATING INNOVATIONS, LLC

( * ) Notice: Subject to any disclaimer, the term of this patent is extended or adjusted under 35 U.S.C. 154(b) by 1801 days.

(21) Appl. No.: 12/166,223

(22) Filed: Jul. 1, 2008

(65) Prior Publication Data

US 2010/0003410 A1  Jan. 7, 2010

(51) Int. Cl.
| | |
|---|---|
| B05D 3/00 | (2006.01) |
| C23C 14/00 | (2006.01) |
| B05C 3/12 | (2006.01) |
| B05C 9/12 | (2006.01) |
| B05D 1/26 | (2006.01) |
| B05D 7/06 | (2006.01) |
| B29C 47/00 | (2006.01) |
| B29C 47/90 | (2006.01) |
| B05C 3/00 | (2006.01) |
| B05C 11/10 | (2006.01) |

(Continued)

(52) U.S. Cl.
CPC ... *B05C 3/12* (2013.01); *B05C 9/12* (2013.01); *B05D 1/265* (2013.01); *B05D 7/06* (2013.01); *B29C 47/003* (2013.01); *B29C 47/90* (2013.01); *B05C 3/005* (2013.01); *B05C 11/1042* (2013.01); *B29C 47/025* (2013.01); *B29K 2711/14* (2013.01)

(58) Field of Classification Search
None
See application file for complete search history.

(56) References Cited

U.S. PATENT DOCUMENTS

| | | | |
|---|---|---|---|
| 2,386,818 | A | 10/1945 | Seavey |
| 2,779,970 | A | 2/1957 | Stocker |

(Continued)

FOREIGN PATENT DOCUMENTS

| | | |
|---|---|---|
| CA | 2133696 A1 | 5/1995 |
| CN | 1444512 A | 9/2003 |

(Continued)

OTHER PUBLICATIONS

E.W. Lemmon, M.O. McLinden and D.G. Friend, "Thermophysical Properties of Fluid Systems" in NIST Chemistry WebBook, NIST Standard Reference Database No. 69, Eds. P.J. Linstrom and W.G. Mallard, National Institute of Standards and Technology, Gaithersburg MD, 20899, http://webbook.nist.gov, (retrieved Jul. 16, 2013).*

(Continued)

*Primary Examiner* — Charles Capozzi
(74) *Attorney, Agent, or Firm* — David B. Tingey; Bryant J. Keller; Kirton McConkie

(57) ABSTRACT

Exemplary pressurization and coating systems, methods, and apparatuses are described herein. In certain embodiments, pressurization systems, methods, and apparatuses are used in conjunction with coating systems, methods, and apparatuses to control pressure about a substrate after a coating material is applied to a surface of the substrate. An exemplary system includes a die tool configured to apply a coating material to a substrate passing through the die tool and a pressurization apparatus attached to the die tool and forming a pressurization chamber. The pressurization apparatus is configured to receive the substrate from the die tool and control pressure about the substrate in the pressurization chamber. In certain embodiments, the die tool forms a coating chamber and is configured to apply the coating material on at least one surface of the substrate in the coating chamber.

21 Claims, 8 Drawing Sheets

(51) Int. Cl.
B29C 47/02 (2006.01)
B29K 711/14 (2006.01)

(56) References Cited

U.S. PATENT DOCUMENTS

| | | | |
|---|---|---|---|
| 2,820,249 A | 1/1958 | Colombo | |
| 2,926,729 A | 3/1960 | Zanini | |
| 2,991,273 A | 7/1961 | Hechelhammer et al. | |
| 2,999,835 A | 9/1961 | Goldberg | |
| 2,999,846 A | 9/1961 | Schnell et al. | |
| 3,028,365 A | 4/1962 | Schnell et al. | |
| 3,060,889 A | 10/1962 | Knapp | |
| 3,076,234 A | 2/1963 | Paulus | |
| 3,084,662 A | 4/1963 | Badger et al. | |
| 3,110,625 A | 11/1963 | Bettner | |
| 3,148,172 A | 9/1964 | Fox | |
| 3,153,008 A | 10/1964 | Fox | |
| 3,169,121 A | 2/1965 | Goldberg | |
| 3,189,514 A | 6/1965 | Shriver et al. | |
| 3,207,814 A | 9/1965 | Goldberg | |
| 3,216,068 A | 11/1965 | Williams | |
| 3,224,705 A * | 12/1965 | Nash | 242/566 |
| 3,271,367 A | 9/1966 | Schnell et al. | |
| 3,432,885 A | 3/1969 | Zanini | |
| 3,457,094 A | 7/1969 | Elmendorf et al. | |
| 3,568,640 A | 3/1971 | Kuettner | |
| 3,590,431 A | 7/1971 | Miller | |
| 3,595,203 A | 7/1971 | Fabulich | |
| 3,599,286 A | 8/1971 | Karet | |
| 3,640,656 A | 2/1972 | Boguslawski | |
| 3,694,538 A | 9/1972 | Okamoto et al. | |
| 3,745,971 A * | 7/1973 | Story | 118/50 |
| 3,772,405 A | 11/1973 | Hamb | |
| 3,773,545 A | 11/1973 | Erb et al. | |
| 3,780,154 A | 12/1973 | Muller et al. | |
| 3,802,386 A | 4/1974 | Wendlandt et al. | |
| 3,808,030 A | 4/1974 | Bell | |
| 3,811,989 A | 5/1974 | Hearn | |
| 3,853,462 A | 12/1974 | Smith | |
| 3,917,890 A | 11/1975 | Levy | |
| 3,922,128 A | 11/1975 | Solomon | |
| 3,941,904 A | 3/1976 | Hoh et al. | |
| 3,957,942 A | 5/1976 | Meudec | |
| 4,000,219 A | 12/1976 | Smejkal | |
| 4,004,774 A | 1/1977 | Houston | |
| 4,030,622 A | 6/1977 | Brooks et al. | |
| 4,039,517 A | 8/1977 | Hamamura et al. | |
| 4,082,486 A | 4/1978 | Cerano et al. | |
| 4,100,243 A | 7/1978 | Wissinger et al. | |
| 4,100,325 A | 7/1978 | Summers et al. | |
| 4,112,145 A | 9/1978 | Cisterni | |
| 4,123,436 A | 10/1978 | Holub et al. | |
| 4,124,574 A | 11/1978 | Preston et al. | |
| 4,143,187 A | 3/1979 | Pilgrim et al. | |
| 4,156,069 A | 5/1979 | Prevorsek et al. | |
| 4,181,764 A | 1/1980 | Totten | |
| 4,190,686 A | 2/1980 | Muis | |
| 4,194,038 A | 3/1980 | Baker et al. | |
| 4,204,821 A | 5/1980 | Gauchel et al. | |
| 4,209,475 A | 6/1980 | Herrington et al. | |
| 4,228,116 A | 10/1980 | Colombo et al. | |
| 4,229,495 A | 10/1980 | Takahashi et al. | |
| 4,247,511 A | 1/1981 | Sutton et al. | |
| 4,248,824 A | 2/1981 | Hattop | |
| 4,308,298 A | 12/1981 | Chen | |
| 4,322,260 A | 3/1982 | Conlon | |
| 4,344,990 A | 8/1982 | Wollam et al. | |
| 4,397,986 A | 8/1983 | Hornbaker | |
| 4,430,484 A | 2/1984 | Quinn | |
| 4,433,088 A | 2/1984 | Haaf et al. | |
| 4,452,933 A | 6/1984 | McCready | |
| 4,465,820 A | 8/1984 | Miller et al. | |
| 4,481,701 A | 11/1984 | Hewitt | |
| 4,488,917 A | 12/1984 | Porter et al. | |
| 4,515,737 A | 5/1985 | Karino et al. | |
| 4,521,363 A | 6/1985 | Vogel | |
| 4,558,096 A | 12/1985 | Boon et al. | |
| 4,567,142 A | 1/1986 | Lloyd | |
| 4,581,807 A | 4/1986 | Adell | |
| 4,613,653 A | 9/1986 | Kitchens et al. | |
| 4,671,913 A | 6/1987 | Gen et al. | |
| 4,691,838 A | 9/1987 | Graham et al. | |
| 4,740,556 A | 4/1988 | Abolins et al. | |
| 4,757,110 A | 7/1988 | Sato | |
| 4,760,114 A | 7/1988 | Haaf et al. | |
| 4,775,597 A | 10/1988 | Birkmeyer et al. | |
| 4,785,962 A | 11/1988 | Toshima | |
| 4,798,453 A | 1/1989 | Tokumaru | |
| 4,807,686 A | 2/1989 | Schnebly et al. | |
| 4,811,533 A | 3/1989 | Wetsel | |
| 4,818,590 A | 4/1989 | Prince et al. | |
| 4,819,167 A | 4/1989 | Cheng et al. | |
| 4,870,923 A | 10/1989 | Sugimoto | |
| 4,884,612 A | 12/1989 | Schnebly et al. | |
| 4,913,760 A | 4/1990 | Benson et al. | |
| 4,928,369 A | 5/1990 | Schnebly et al. | |
| 4,935,306 A | 6/1990 | Ohtsuka et al. | |
| 4,936,359 A | 6/1990 | Totten | |
| 4,938,823 A | 7/1990 | Balazek et al. | |
| 4,940,504 A | 7/1990 | Starnes, Jr. | |
| 4,942,084 A | 7/1990 | Prince | |
| 4,945,969 A | 8/1990 | Schnebly et al. | |
| 4,981,989 A | 1/1991 | Wissner et al. | |
| 4,982,014 A | 1/1991 | Freitag et al. | |
| 4,987,702 A | 1/1991 | Anschutz | |
| 4,987,856 A | 1/1991 | Hey et al. | |
| 5,010,162 A | 4/1991 | Serini et al. | |
| 5,053,176 A | 10/1991 | Cameron et al. | |
| 5,084,511 A | 1/1992 | Abe et al. | |
| 5,086,598 A | 2/1992 | Weldy | |
| 5,118,357 A * | 6/1992 | Sabatka | 134/15 |
| 5,141,041 A | 8/1992 | Katz et al. | |
| 5,162,058 A | 11/1992 | Uenaka et al. | |
| 5,166,237 A | 11/1992 | Abe et al. | |
| 5,169,699 A | 12/1992 | Prince | |
| 5,192,586 A * | 3/1993 | Mertinooke et al. | 427/210 |
| 5,194,209 A | 3/1993 | Schwaegerle | |
| 5,209,282 A | 5/1993 | Franco et al. | |
| 5,215,698 A | 6/1993 | Altimus | |
| D338,535 S | 8/1993 | Robertson | |
| RE34,547 E | 2/1994 | Weldy | |
| 5,286,547 A | 2/1994 | Tyerman | |
| 5,288,559 A | 2/1994 | Oka et al. | |
| 5,312,863 A | 5/1994 | Van Rheenen et al. | |
| 5,318,737 A | 6/1994 | Trabert et al. | |
| 5,326,520 A | 7/1994 | Franck et al. | |
| 5,326,592 A | 7/1994 | Goewey et al. | |
| 5,372,858 A * | 12/1994 | Saylor, III | 427/512 |
| 5,382,401 A | 1/1995 | Pickett et al. | |
| 5,387,381 A | 2/1995 | Saloom | |
| 5,405,705 A | 4/1995 | Fujimoto et al. | |
| 5,406,768 A | 4/1995 | Giuseppe et al. | |
| 5,415,822 A | 5/1995 | Cook | |
| 5,415,943 A | 5/1995 | Groger et al. | |
| 5,449,408 A | 9/1995 | Koaizawa et al. | |
| 5,484,632 A | 1/1996 | Mercer, Jr. et al. | |
| 5,495,883 A | 3/1996 | Jelic | |
| 5,567,505 A | 10/1996 | Dehennau et al. | |
| 5,613,540 A | 3/1997 | Jelic | |
| 5,648,126 A | 7/1997 | Kameya et al. | |
| 5,654,347 A | 8/1997 | Khemani et al. | |
| 5,658,382 A | 8/1997 | Lindblad | |
| 5,665,162 A | 9/1997 | Sasaki et al. | |
| 5,672,303 A | 9/1997 | Metzger et al. | |
| 5,674,928 A | 10/1997 | Chisholm et al. | |
| 5,680,891 A | 10/1997 | Prince | |
| 5,696,176 A | 12/1997 | Khemani et al. | |
| 5,704,978 A | 1/1998 | Maniwa et al. | |
| 5,709,910 A * | 1/1998 | Argyle et al. | 427/434.2 |
| 5,723,199 A | 3/1998 | Boot | |
| 5,725,944 A | 3/1998 | Jones et al. | |
| 5,730,801 A | 3/1998 | Tepman et al. | |
| 5,733,632 A | 3/1998 | Marusak | |
| 5,738,814 A | 4/1998 | Kreth et al. | |

(56) References Cited

U.S. PATENT DOCUMENTS

| | | |
|---|---|---|
| 5,741,823 A | 4/1998 | Hsu |
| 5,759,680 A | 6/1998 | Brooks et al. |
| 5,773,138 A | 6/1998 | Seethamraju et al. |
| 5,788,772 A | 8/1998 | Kunieda et al. |
| 5,795,641 A | 8/1998 | Pauley et al. |
| 5,824,373 A | 10/1998 | Biller et al. |
| 5,832,979 A | 11/1998 | Marusak |
| 5,866,054 A | 2/1999 | Dorchester et al. |
| 5,897,708 A | 4/1999 | Hsu |
| 5,898,043 A | 4/1999 | Uemae et al. |
| D409,869 S | 5/1999 | Marusak |
| 5,907,006 A | 5/1999 | Rennie et al. |
| 5,911,834 A | 6/1999 | Fairbairn et al. |
| 5,914,083 A | 6/1999 | Yada et al. |
| 5,919,517 A | 7/1999 | Levendusky et al. |
| 5,925,698 A | 7/1999 | Steckel |
| 5,941,033 A | 8/1999 | Adams |
| 5,951,805 A | 9/1999 | Nonis et al. |
| 5,957,183 A | 9/1999 | Prince |
| 5,962,573 A | 10/1999 | Berta |
| 5,972,471 A | 10/1999 | Jasenof et al. |
| 5,976,676 A | 11/1999 | Miki et al. |
| 5,985,397 A | 11/1999 | Witt et al. |
| 5,997,456 A | 12/1999 | Butters et al. |
| 6,020,414 A | 2/2000 | Nelsen et al. |
| 6,054,207 A | 4/2000 | Finley |
| 6,074,727 A | 6/2000 | Miller et al. |
| 6,083,601 A | 7/2000 | Prince et al. |
| 6,093,773 A | 7/2000 | Evans et al. |
| 6,112,800 A | 9/2000 | Marusak |
| 6,114,021 A | 9/2000 | Pankratz et al. |
| 6,125,906 A | 10/2000 | Kotin |
| 6,153,264 A | 11/2000 | Schmid et al. |
| 6,174,569 B1 | 1/2001 | Blomer et al. |
| 6,197,412 B1 | 3/2001 | Jambois |
| 6,203,915 B1 | 3/2001 | Prissok et al. |
| 6,206,965 B1 | 3/2001 | Rao et al. |
| 6,265,027 B1 | 7/2001 | Johnston et al. |
| 6,284,046 B1 | 9/2001 | Orita et al. |
| 6,306,507 B1 | 10/2001 | Brunelle et al. |
| 6,309,492 B1 | 10/2001 | Seidner |
| 6,352,784 B1 | 3/2002 | Katagiri |
| 6,353,050 B1 | 3/2002 | Bastiaens et al. |
| 6,376,012 B1 | 4/2002 | Innes et al. |
| 6,379,597 B1 | 4/2002 | Brucker |
| 6,391,461 B1 | 5/2002 | Ryntz et al. |
| 6,394,784 B1 | 5/2002 | Gellert et al. |
| 6,448,328 B1 | 9/2002 | Kappler et al. |
| 6,455,161 B1 | 9/2002 | Regnier et al. |
| 6,461,792 B1 | 10/2002 | Kawamura et al. |
| 6,500,895 B1 | 12/2002 | Bastiaens et al. |
| 6,516,860 B1 | 2/2003 | Weaver et al. |
| 6,540,624 B1 | 4/2003 | Isogawa |
| 6,541,304 B1 | 4/2003 | Bouras et al. |
| 6,576,309 B2 | 6/2003 | Dalgewicz, III et al. |
| 6,579,611 B1 | 6/2003 | Iwashita et al. |
| 6,583,189 B1 | 6/2003 | King |
| 6,584,743 B2 | 7/2003 | Paxton et al. |
| 6,592,668 B2 | 7/2003 | Rao et al. |
| 6,596,784 B1 | 7/2003 | King |
| 6,601,357 B2 | 8/2003 | Tunis |
| 6,616,998 B2 | 9/2003 | Greer et al. |
| 6,644,374 B2 | 11/2003 | Nien |
| 6,652,654 B1 * | 11/2003 | Propp et al. .................. 118/718 |
| 6,660,086 B1 | 12/2003 | Prince et al. |
| 6,667,367 B1 | 12/2003 | Berta |
| 6,680,104 B2 | 1/2004 | Boris et al. |
| 6,716,522 B2 | 4/2004 | Matsumoto et al. |
| 6,792,995 B2 | 9/2004 | Judkins |
| 6,845,801 B2 | 1/2005 | Hsu |
| 6,852,765 B2 | 2/2005 | Decker et al. |
| 6,905,646 B1 | 6/2005 | Oka et al. |
| 6,933,043 B2 | 8/2005 | Son et al. |
| 6,994,752 B2 | 2/2006 | Estrada et al. |
| 7,022,768 B1 | 4/2006 | Lacroix et al. |
| 7,081,488 B2 | 7/2006 | Bardman et al. |
| 7,097,879 B2 | 8/2006 | Bolton et al. |
| 7,160,977 B2 | 1/2007 | Hale et al. |
| 7,175,905 B2 | 2/2007 | Curtis et al. |
| 7,226,985 B2 | 6/2007 | Hale et al. |
| 7,318,985 B2 | 1/2008 | Wang |
| 7,335,399 B2 | 2/2008 | Bolton et al. |
| 7,368,511 B2 | 5/2008 | Hale et al. |
| 7,374,795 B2 | 5/2008 | Prince et al. |
| 7,435,483 B2 | 10/2008 | Lee et al. |
| 7,694,468 B2 | 4/2010 | Prince et al. |
| 7,793,700 B2 | 9/2010 | Bossler |
| 8,071,198 B2 | 12/2011 | Michalczyk et al. |
| 8,071,695 B2 | 12/2011 | Strand et al. |
| 8,113,143 B2 | 2/2012 | Prince et al. |
| 8,197,733 B2 | 6/2012 | Sudano |
| 8,394,784 B2 | 3/2013 | Stroumpoulis et al. |
| 8,734,909 B2 | 5/2014 | Iyer et al. |
| 2001/0050045 A1 | 12/2001 | Rao et al. |
| 2002/0168532 A1 | 11/2002 | Sinsel et al. |
| 2004/0028764 A1 | 2/2004 | Janikowski et al. |
| 2004/0033314 A1 | 2/2004 | Rao et al. |
| 2004/0089428 A1 | 5/2004 | Judkins |
| 2004/0109946 A1 * | 6/2004 | Prince et al. .................. 427/314 |
| 2005/0081475 A1 | 4/2005 | Edger et al. |
| 2005/0092448 A1 | 5/2005 | Lin |
| 2005/0102963 A1 | 5/2005 | Nien et al. |
| 2005/0106406 A1 | 5/2005 | Curtis |
| 2005/0224551 A1 * | 10/2005 | Hein et al. .................. 226/190 |
| 2006/0022376 A1 | 2/2006 | Prince et al. |
| 2006/0076712 A1 | 4/2006 | Yonemochi et al. |
| 2006/0111519 A1 | 5/2006 | Strand et al. |
| 2006/0270806 A1 | 11/2006 | Hale |
| 2007/0000568 A1 | 1/2007 | Bohme et al. |
| 2007/0013096 A1 | 1/2007 | Rekret |
| 2007/0020475 A1 | 1/2007 | Prince et al. |
| 2007/0095486 A1 | 5/2007 | Huang et al. |
| 2007/0102107 A1 | 5/2007 | Curtis |
| 2007/0175392 A1 | 8/2007 | Znamensky |
| 2007/0292569 A1 | 12/2007 | Bohme et al. |
| 2008/0145564 A1 | 6/2008 | Allam et al. |
| 2008/0314312 A1 | 12/2008 | Prince et al. |
| 2009/0011164 A1 | 1/2009 | Masuda et al. |
| 2009/0036581 A1 | 2/2009 | Joshi et al. |
| 2010/0003410 A1 | 1/2010 | King et al. |
| 2010/0021677 A1 | 1/2010 | West et al. |
| 2011/0223342 A1 | 9/2011 | Iyer et al. |
| 2012/0168094 A1 | 7/2012 | Lin |
| 2013/0145985 A1 | 6/2013 | Prince et al. |
| 2013/0287960 A1 | 10/2013 | King et al. |

FOREIGN PATENT DOCUMENTS

| | | |
|---|---|---|
| DE | 25 03 354 | 1/1975 |
| DE | 40 12 962 | 9/1991 |
| DE | 4012962 | 9/1991 |
| DE | 9316759 U1 | 2/1994 |
| DE | 4424767 C1 | 11/1995 |
| DE | 19857045 A1 | 6/2000 |
| EP | 0132218 A2 | 1/1985 |
| EP | 0 201 097 | 12/1986 |
| EP | 0 210 297 | 4/1987 |
| EP | 0488711 A2 | 6/1992 |
| EP | 0510463 A1 | 10/1992 |
| EP | 653469 A2 | 5/1995 |
| FR | 2861738 A1 | 5/2005 |
| GB | 1397270 A | 6/1975 |
| GB | 2024658 A | 1/1980 |
| JP | S59155024 A | 9/1984 |
| JP | 1225647 A | 9/1989 |
| JP | 326752 A | 2/1991 |
| JP | 7117094 | 5/1995 |
| JP | 1996034866 A | 2/1996 |
| JP | 08300590 | 11/1996 |
| JP | 9324135 A | 12/1997 |
| JP | 1190827 A | 4/1999 |
| JP | 1999245590 A | 9/1999 |
| JP | 2002337291 A | 11/2002 |
| JP | 2003056168 A | 2/2003 |

(56) References Cited

FOREIGN PATENT DOCUMENTS

| | | |
|---|---|---|
| JP | 2004211039 A | 7/2004 |
| JP | 2005264136 A | 9/2005 |
| JP | 2006281544 A | 10/2006 |
| NZ | 212357 | 10/1988 |
| TW | 341533 | 10/1998 |
| WO | WO 96/18685 A1 | 6/1996 |
| WO | WO 97/46627 A1 | 12/1997 |
| WO | WO 98/27159 A1 | 6/1998 |
| WO | WO 01/27200 A3 | 4/2001 |
| WO | WO 01/66266 A1 | 9/2001 |
| WO | WO 2006/093916 A2 | 9/2006 |
| WO | WO 2008/040498 A1 | 4/2008 |
| WO | WO 2010/002764 A1 | 1/2010 |
| WO | WO 2013/165773 A1 | 11/2013 |

OTHER PUBLICATIONS

International Search Report and Written Opinion received in International Application No. PCT/US2009/049010.
"The Condensed Chemical Dictionary Tenth Edition"; Van Nostrand Reinhold Company (New York); 1981; pp. 2 and 90.
Merriam-Webster's Collegiate Dictionary, 10th edition, 1997, p. 54.
Billmeyer, "Textbook of Polymer Science", $3^{rd}$ Edition, John Wiley & Sons, Inc., New York, 1984, p. 153.
Carraher, "Introduction to Polymer Chemistry" $3^{rd}$ Edition, CRC Press, Taylor & France Group, Boca Raton, FL, 2013, p. 2013.
December, Timothy S., et al., "The Effects of TPO Composition on Adhesion and Proposed Chemical Mechanism"; Paint and Coatings Industry; Mar. 2008, pp. 76-82, www.pcimag.com.
Berta, Dominic A., "Formulating Plastics for Paint Adhesion"; Chapter 3 from Coating of Polymers and Plastics, 2003, pp. 85-119, edited by Ryntz, Rose, A. and Yaneff, Phillip V.
ASTM International, "Standard Test Method for Specular Gloss of Plastic Films and Solid Plastics", Designation: D2457, 2008, pp. 1-6.
ASTM International, "Standard Test Method for Measuring Adhesion by Tape Test", Designation: D3359, 2002, pp. 1-7.
ASTM International, "Standard Test Method for Peel Adhesion of Pressure-Sensitive Tape", Designation: D3330/D 3330M, 2004, pp. 1-6.
ASTM International, "Standard Test Method for Specular Gloss", Designation: D523, 2008, pp. 1-5.
ASTM International, "Standard Practice for Obtaining Spectrometric Data for Object-Color Evaluation", Designation: E1164, 2009, pp. 1-8.
ASTM International, "Standard Practice for Computing the Colors of Objects by Using the CIE System", Designation: E308, 2008, pp. 1-34.
"Blendex BMAT Data Sheet Styrene Acrylonitrile", Chemtura, Sep. 13, 2012, p. 1, http://www.ides.com/info/datasheet/E73798/Blendex-BMAT.
"Paraloid™ KM-377 Acrylic Impact Modifier for Vinyl Building Products", Technical Data Sheet, The Dow Chemical Company, pp. 1-4.
"Blendex BMAT Modifier Resin", Chemtura, Effective Jun. 4, 2008, (2007), p. 1, www.chemtura.com.
"Butyl acrylate-methyl methacrylate polymers", Chemical Book, 2008, p. 1, www.chemicalbook.com.
"Paraloid™ KM-377 Impact Modifier", Material Safety Data Sheet, DOW, Revision Date: Feb. 7, 2004, pp. 1-6.
Turner, S.R., et al., "Polyesters Based on 1,4-Cyclohexanedimethanol", Modern Polyesters: Chemistry and Technology of Polyesters and Copolyesters, 2003, pp. 280-282.
"Chlorocarbons and Chlorohydrocardbons-$C^2$ to Combustion Technology", Encyclopedia of Chemical Technology, $4^{th}$ Edition, vol. 6, 1993, pp. 620-623.
Strasser, CFD Investigation of Gear Pump Mixing Using Deforming/Agglomerating Mesh, J. Fluids Eng., Apr. 2007, vol. 129, Issue 4, 476, pp. 1-9.

* cited by examiner

PRESSURIZATION COATING SYSTEMS, METHODS, AND APPARATUSES

BACKGROUND

Conventional processes for applying a coating on a substrate surface have limitations. For example, some standard coating processes require the use of solvents, electrostatic adhesion, or final heating stages, which typically increase expenses and limit manufacturing throughput.

Further, certain conventional coating processes are practical for applying only specific substances to specific substrates. For example, a coating process that utilizes high temperatures may not be practical for applying a coating to a substrate that includes enough moisture that the high temperatures will cause moisture to turn to steam and "steam off" of the substrate and/or the coating. This "steam off" effect can introduce defects in coatings and coated products. Consequently, the "steam off" effect may preclude the use of certain coating processes and/or substances with certain substrates such as some wood or wood-based products (e.g., decorative moldings or other finish carpentry products), for example.

BRIEF DESCRIPTION OF THE DRAWINGS

The accompanying drawings illustrate various embodiments of the principles described herein and are a part of the specification. The illustrated embodiments are merely examples and do not limit the scope of the disclosure or the claims.

DETAILED DESCRIPTION

Figure 1:
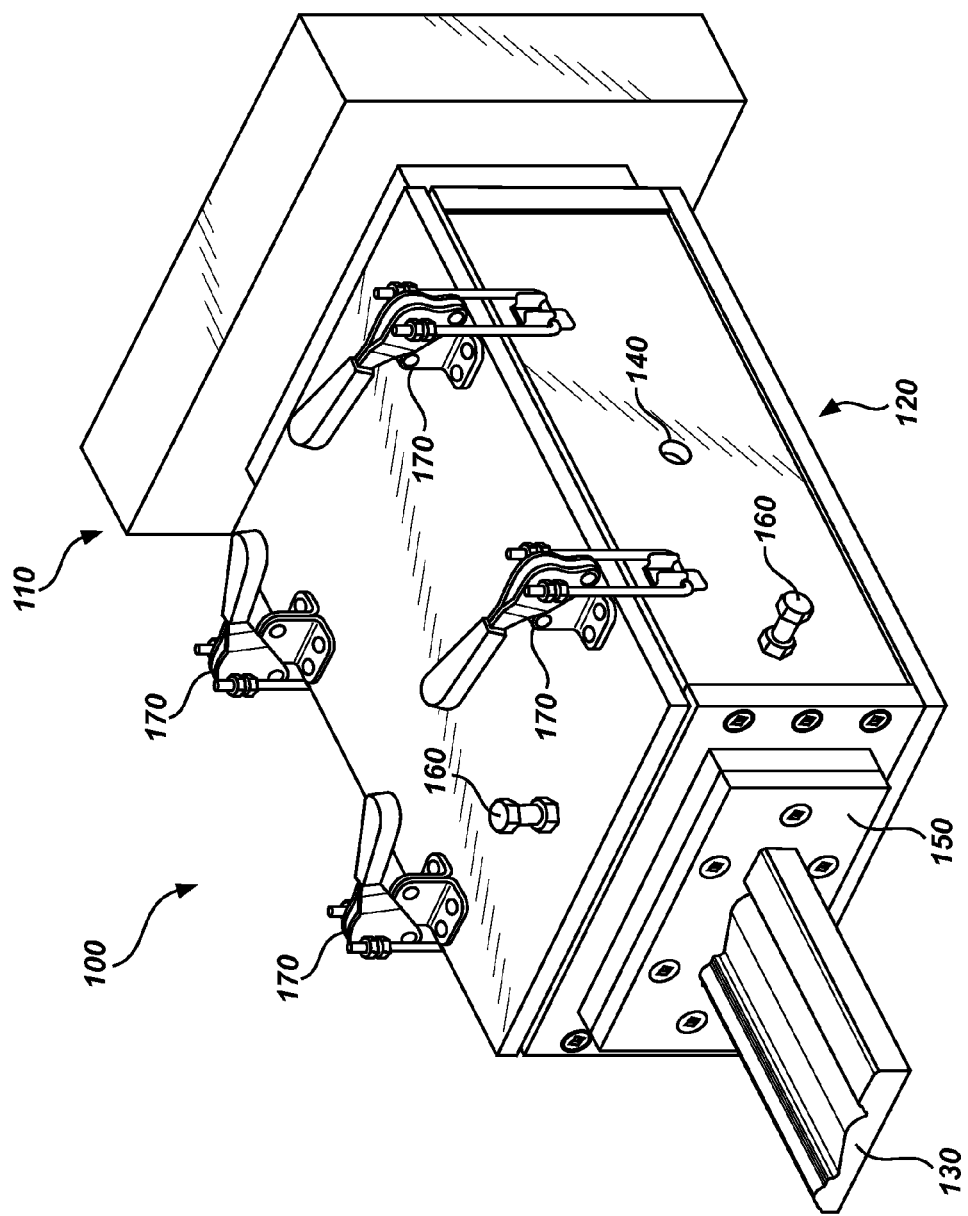
FIG. 1 is a perspective view illustrating an exemplary pressurization coating system, according to principles described herein.

Exemplary pressurization and coating systems, methods, and apparatuses for use in applying a coating on a substrate surface are disclosed. Pressurization systems, methods, and apparatuses may be used as part of systems, methods, and apparatuses for applying a coating on a substrate surface. In certain implementations, the pressurization systems, methods, and apparatuses may help expand the capabilities of coating systems, methods, and apparatuses, such as by broadening the range of substrates that may be practically coated and/or the coating materials that may be applied to substrates, and reducing or eliminating occurrences of errors and blemishes, for example.

According to principles disclosed herein, one or more suitable coating materials may be applied to a substrate surface. Suitable coating materials may include, but are not limited to, fluid-state materials such as liquid plastics, including plastics configured to adhere to specific substrates such as wood. In certain embodiments, a coating material, including a coating material in a solid (e.g., pellet or powder) state or a liquid state may be pretreated in preparation for application of the coating material to a substrate surface. This may include heating the coating material. For instance, a coating material in a solid state may be heated to a liquid state for application to the substrate surface.

A coating material may include, but is not limited to, acrylics, polyesters, polypropylenes, polyethylene, polyvinylchlorides (PVC), polyolefins, ABS, ASA, or an alloy of any of the above. Additionally, the coating material may include other materials, including, but not limited to, color pigments, ultraviolet stabilizers, emulsifiers, rubbers, and other types of stabilizers potentially helpful for creating a durable and/or decorative finish to a coating applied to a substrate. A bulk carrying material, which may function primarily as a binder to the substrate, may include, but is not limited to, acrylics, polyesters, etc. In some coating applications, the bulk carrying material typically comprises between approximately seventy to eighty percent (70-80%) of the coating material, the pigmentation typically includes approximately ten percent (10%) of the coating material, and the remaining ten to twenty percent (10-20%) of the coating material includes ultraviolet stabilizers, emulsifiers, and any of the other elements mentioned above.

A coating material may be applied to a surface of any suitable substrate according to principles described herein. Examples of substrates that may be coated include, but are not limited to, wood surfaces, wood, clear wood, natural wood, wood hybrid products, wood-based products, medium-density fiberboard (MDF), particle board, plastics, metals, metal-type objects, glass, glass-based products, fiberglass, natural products, synthetic products, and any other suitable object that is substantially rigid so that its shape is maintained as it is subjected to a coating process. In certain coating applications, the principles described herein may be used to apply a coating such as a molten plastic on a surface of a substrate such as a wood product, or the like.

Turning now to the Figures, FIG. 1 illustrates an exemplary pressurization coating system 100 (or simply "system 100"). System 100 includes a die tool 110 and a pressurization apparatus 120, which may be attached to one another as shown in FIG. 1. A substrate 130 may be passed through the die tool 110 and the pressurization apparatus 120. FIG. 1 shows a portion of a substrate 130 that has passed through die tool 110 and pressurization apparatus 120 and exited from the pressurization apparatus 120. In the illustrated example, substrate 130 includes a decorative finish carpentry product (e.g., a molding having a decorative profile). This is illustrative only. System 100 may be configured to apply one or more coating materials to any suitable substrate, including any of those listed above.

Die tool 110 may be configured to apply a coating material to substrate 130 as the substrate 130 passes through the die tool 110. Die tool 110 may include any mechanism(s) and employ any technologies suitable for applying a coating material to the substrate 130. In certain embodiments, for example, a liquid coating material may be collected and extruded on at least one surface of the substrate 130 within the die tool 110.

Figure 2:
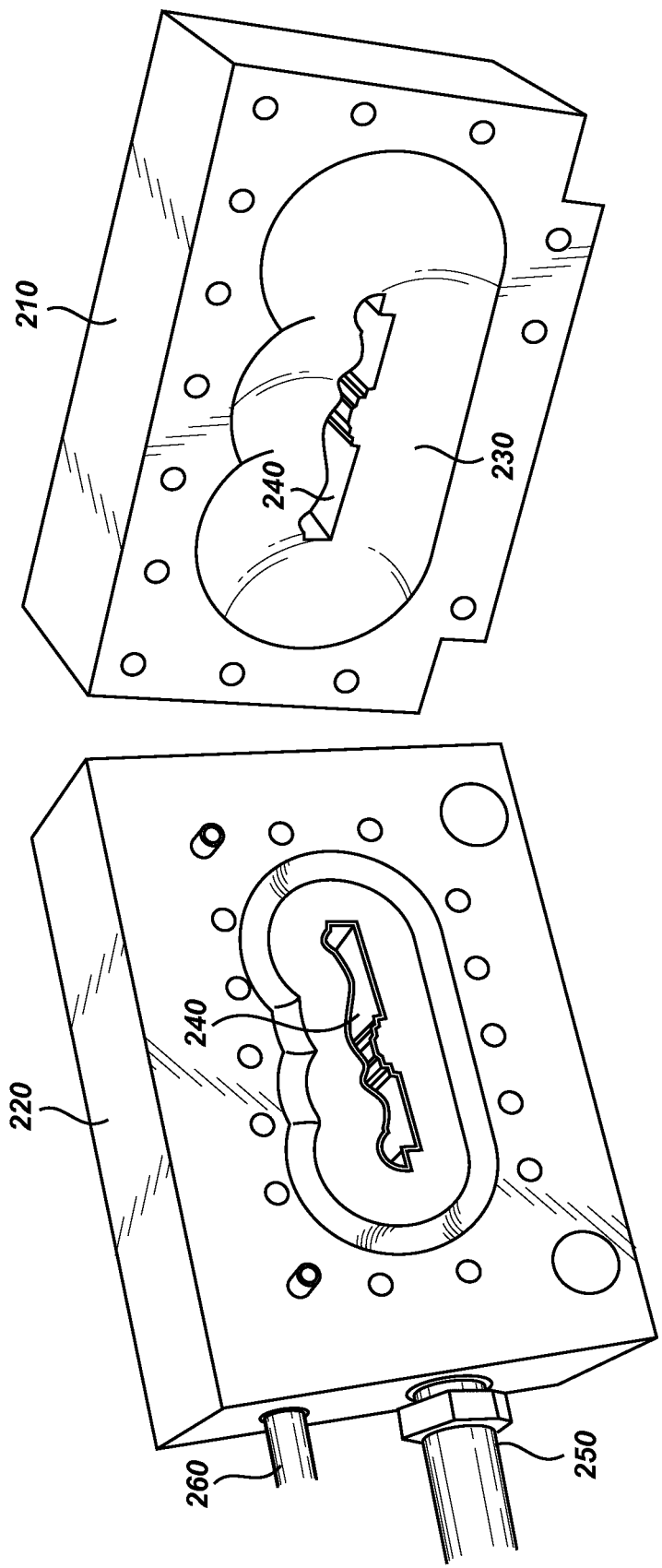
FIG. 2 is a view of an interior of the die tool included in the pressurization system of FIG. 1, according to principles described herein.

FIG. 2 illustrates a first die shell 210 and a second die shell 220 that may be attached to one another to form at least a part of the die tool 110 having a cavity 230 therein. As shown in FIG. 2, first die shell 210 and second die shell 220 may each form an aperture 240 through which the substrate 130 may pass. In the illustrated example, apertures 240 are shaped to fit a profile of the substrate 130.

The cavity 230 formed within die tool 110, or at least a portion of the cavity 230, may be referred to as a coating chamber within which a coating material may be applied to the substrate 130. In certain embodiments, the die tool 110 may be configured to receive a coating material, such as by way of a coating material feed 250. The coating material may accumulate in at least a portion of the coating chamber within the die tool 110. As the substrate 130 passes through the coating chamber, the coating material is applied to at least one surface of the substrate 130.

In certain embodiments, the die tool 110 may be heated. The die tool 110 may be heated in any suitable manner, such as by being connected to a heat source by a heating element 260. In certain embodiments, the die tool 110 may be configured to be heated to a temperature that is suitable for applying a coating material to the substrate 130. For example, where the die tool 110 is configured to extrude a coating material on at least one surface of the substrate 130 with the coating chamber, the die tool 110 may be heated to a temperature that is conducive to the extrusion.

While FIG. 2 illustrates exemplary components of a die tool 110, the example is illustrative only. Other suitable die tools 110 and coating apparatuses or processes may be used in other embodiments. For example, die tool 110 may include and/or employ any suitable mechanisms and/or processes for applying a coating material to a substrate 130.

In certain implementations, a coating material may be applied to the substrate 130 in any of the ways described in U.S. Pat. No. 6,660,086, granted Dec. 9, 2003, and titled "Method and Apparatus for Extruding a Coating Upon a Substrate Surface," the content of which is hereby incorporated by reference in its entirety. According to the '086 patent, a coating material may be heated to a fluid state and provided to a die (e.g., see reference number 56 in FIGS. 3, 4, and 9 of the '086 patent), which includes a cavity within which the coating material may accumulate in fluid state. The die includes an aperture that has a two dimensional profile matching that of the substrate. The dimensions of the substrate may be adjusted to account for the aperture profile and the coating finish to be applied on the substrate. The substrate passes through the die in conformance to the profile matching the die. As the substrate passes through the die profile, the coating material is applied to the surface of the substrate in a controlled manner, as described in the '086 patent. In certain implementations, the die tool 110 may comprise and/or be configured like the die described in the '086 patent (e.g., see reference number 56 in FIGS. 3, 4, and 9 of the '086 patent).

In certain implementations, as a fluid-state coating material is provided to the die tool 110 and the substrate 130 passes through the die tool 110, a pressurized environment may be formed within the die tool 110. In certain coating applications, the pressure level may be approximately two hundred to eight hundred pounds per square inch (200-800 psi) within the die tool 110. In addition, the environment within the die may be subjected to high temperatures. This is due at least in part to the coating material being heated to a fluid state and/or the die tool 110 being heated. In certain coating applications, the temperatures within the die tool 110 may reach approximately three hundred to six hundred degrees Fahrenheit (300-600° F.). These ranges are illustrative only and not limiting. Other temperature and pressure ranges may occur in other coating applications and embodiments.

Without the pressurization apparatus 120 attached to the die tool 110 as shown in FIG. 1, as the coated substrate 130 exits the exit aperture 240 of the die tool 110, the coated substrate 130 may be subjected to a sudden change in environment, including a sudden change in pressure from the pressurized environment in the die tool 110 to atmospheric pressure and/or a sudden decrease in environmental temperature from the high temperatures in the die tool 110 to room temperatures, for example. One or more of these sudden changes in environmental pressure and/or temperature can significantly affect the quality of a coating that has been applied on a surface of the substrate 130. For example, various substrates 130 may include different amounts of moisture. The more moisture present in a substrate 130, the more susceptible the substrate 130 may be to reacting to sudden environmental changes. For instance, when such a substrate 130 is subjected to a high temperature and high pressure environment such as may exist in the die tool 110, the high pressure may prevent the moisture from turning to steam at the high temperatures. That is, the high pressure may raise the boiling point for the moisture such that the high temperatures do not cause the moisture to boil in the die tool 110. However, when the substrate 130 exits the die tool 110 and is suddenly subjected to atmospheric pressure without having time to sufficiently cool, at least some of the moisture may turn to steam and "steam off" of the substrate 130. This can deform the coating, including introducing bubbles, ripples, and holes in the coating. Accordingly, while a coating process may be well suited for coating some substrates 130 with certain coating materials, the same coating process may not be a practical choice for coating other substrates 130 that include relatively higher amounts of moisture, or for using certain coating materials.

Pressurization apparatus 120 may be implemented in system 100 as shown in FIG. 1 and may in certain examples broaden the types of substrates 130 and/or coating materials that may be used in a coating process, including making a pressurization coating process a practical option for applying a coating to a substrate 130 having moisture content that could have otherwise "steamed off" if the pressurization apparatus 120 was not employed in the coating process.

As shown in FIG. 1, the pressurization apparatus 120 may be attached to die tool 110 and configured to receive the substrate 130 from the die tool 110 as the substrate 130 exits from the die tool 110. The pressurization apparatus 120 may form a pressurization chamber and may include and/or employ any suitable technologies for pressurizing and/or controlling pressure within the pressurization chamber. For example, air or one or more other gaseous elements may be forced into the pressurization chamber through one or more apertures in the pressurization apparatus 120. FIG. 1 shows an aperture 140 formed within a side plate of the pressurization apparatus 120. One or more pressurization tools such as an air hose and a pressure gauge may be attached to the aperture 140 such that the air pressure in the pressurization chamber may be controlled and monitored. An air compressor or other suitable air source may be used to force air through the aperture 140 and into the pressurization chamber. In certain embodiments, another aperture may be included in the opposite side plate of the pressurization apparatus 120, and air may be forced into the pressurization chamber through both apertures 140. These examples of pressurizing the pressure chamber are illustrative only. Other suitable pressurization tools and processes may be included and/or utilized in other embodiments.

The pressure in the pressurization chamber of the apparatus 120 may be set to and/or maintained at any suitable level.

In certain applications, pressure in the pressurization chamber may be maintained at a level between atmospheric pressure and a pressure within the coating chamber of the die tool 110. For certain exemplary applications, pressure levels ranging from approximately five to eighty pounds per square inch (5-80 psi) are used. In other exemplary applications, pressure levels ranging from approximately ten to fifty pounds per square inch (10-50 psi) are used. However, these ranges are illustrative only and not limiting. Other suitable pressure levels or ranges of pressure levels may be used for other applications.

Figure 3:
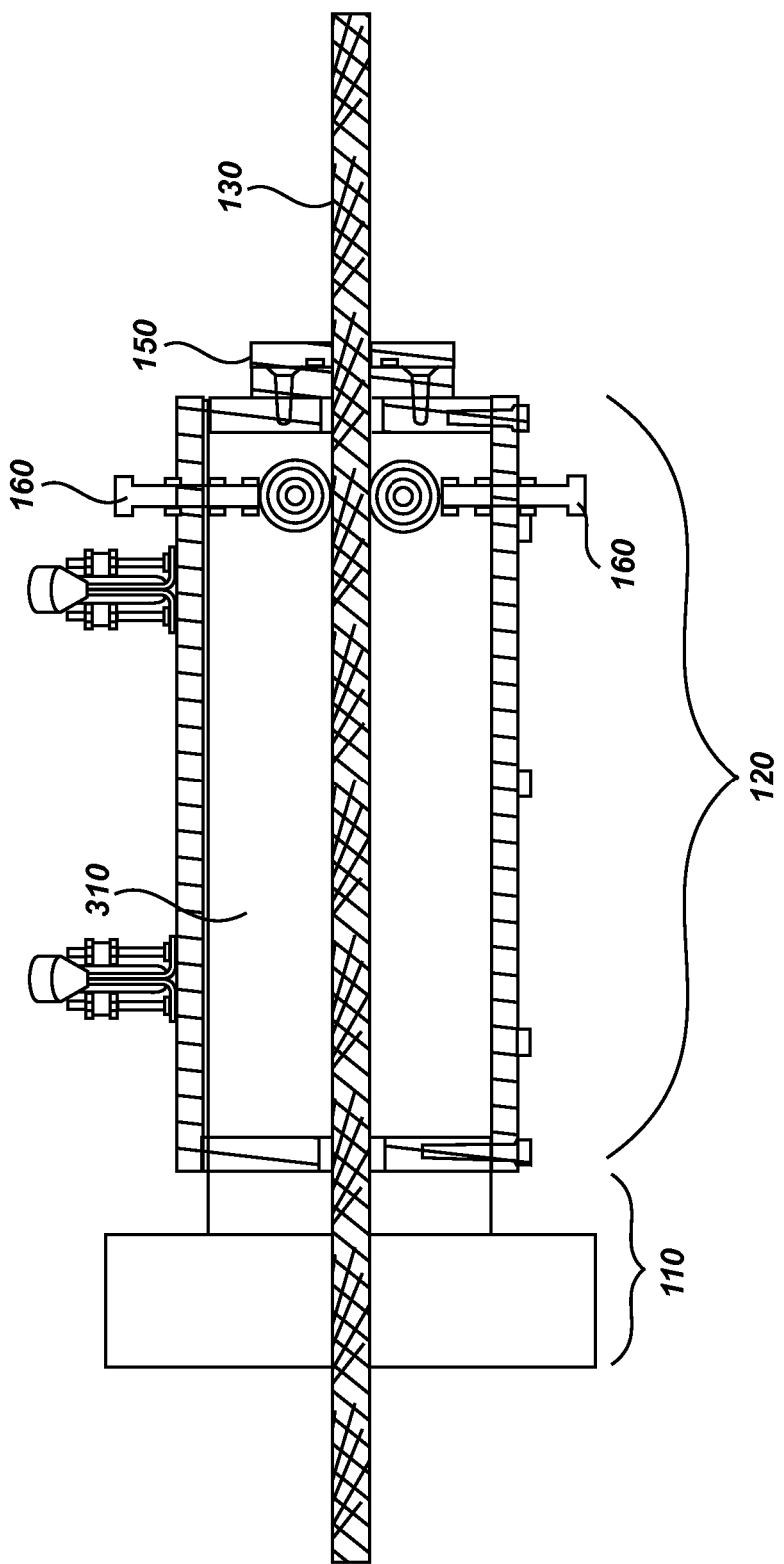
FIG. 3 is a cut-away side view of the pressurization apparatus included in the pressurization system of FIG. 1, according to principles described herein.

The pressurization apparatus 120 may be attached to the die tool 110 in any manner suitable for maintaining a controlled air pressure within the pressurization chamber. An attachment of the apparatus 120 to the die tool 110 may form a seal (e.g., an air pressure seal) between the outer face of the die tool 110 (e.g., an outer face of a die plate of the die tool 110) and an outer surface of the pressurization apparatus 120. FIG. 3 illustrates a cut-away side view of the pressurization apparatus 120 in system 100. As shown, a wall of the pressurization apparatus 120 is attached flush against an outer face of the die tool 110. In certain exemplary embodiments, a wall of the apparatus 120 is bolted to the die tool 110 in a manner that forms a seal suitable for maintaining a controlled air pressure in the pressurization chamber. The pressurization chamber is identified by reference number 310 in FIG. 3.

As the substrate 130 exits the die tool 110, it moves directly into the pressurization chamber 310 formed by the pressurization apparatus 120. A wall of the apparatus 120 may include an entry aperture through which the substrate 130 may pass and enter the chamber 310. The entry aperture may be any suitable two-dimensional configuration through which the substrate 130 can pass. The entry aperture may or may not fit the profile of the substrate 130. In certain implementations, the entry aperture may be substantially larger than the profile of the substrate 130 inasmuch as an exit aperture 240 of the die tool 110 may be configured to form a seal around the substrate 130, which seal can function as a seal between the coating chamber and the pressurization chamber 310, especially when the pressure level in the coating chamber of the die tool 110 is greater than the pressure level in the pressurization chamber 310.

While the coated substrate 130 is in the pressurization chamber 310, the pressure level in the chamber 310 may be maintained at a level designed to prevent moisture within the substrate 130 and/or the applied coating material from "steaming off," or to at least minimize the amount of moisture that "steams off." In certain applications, the pressure level within the chamber 310 in effect raises the boiling point of moisture included in the substrate 130 and/or the applied coating material as compared to what the boiling point of the moisture would be at atmospheric pressure. Accordingly, subjecting the substrate 130 and/or coating material to a higher pressure environment as compared to atmospheric pressure upon exit of the substrate 130 from the die tool 110 may reduce and/or even eliminate moisture "steam off" that may otherwise occur after a coating material has been applied to the substrate 130 at a high temperature and pressure in the die tool 110. Hence, the pressurization apparatus 120 may be employed to expand the types of substrate products and/or coating materials that can be used in coating processes. For example, a wood product or wood-based product that may experience "steam off" when the pressurization apparatus 120 is not used in a coating process may experience no "steam off," or at least reduced "steam off," when the pressurization apparatus 120 is employed in the coating process.

The pressurization chamber 310 may provide time for the temperature of the substrate 130 to cool at a controlled pressure level so that when the substrate 130 exits the pressurization chamber 310 and is subjected to atmospheric pressure, the temperature of the substrate 130 may have cooled to a point that "steam off" does not occur, or the amount of "steam off" that occurs is minimized. The time that a portion of a substrate 130 is in the pressurization chamber 310 may be referred to as "dwell time."

The amount of cooling that occurs in the pressurization chamber 310 may be determined based one or more factors, including the size of the pressurization chamber 310 (e.g., the length of the chamber through which the substrate 130 passes), temperatures within the chamber 310, the dwell tile of the substrate 130 in the chamber 310, and the speed at which the substrate 130 passes through the chamber 310. One or more of these factors may be adjusted to suit a particular coating application. For example, the length of the chamber 310 and/or the substrate pass-through rate may be adjusted such that a desired amount of cooling may take place within the pressurized chamber 310 while the substrate 310 is subjected to controlled pressure.

For certain exemplary coating applications, the apparatus 120 may be approximately twelve inches to twenty four inches (12-24 inches) in length, the air pressure in the chamber 310 may be approximately five to eighty pounds per square inch (5-80 psi), and the speed at which the substrate 130 is passed through the pressurization chamber 310 may be approximately ten to two hundred feet per minute (10-200 ft/min). These settings are illustrative only. Other settings may be used in other applications.

The substrate 130 may be fed through the die tool 110 and pressurization apparatus 120 in any suitable manner, including any of the ways described in the '086 patent, for example. As shown in FIG. 1, the pressurization apparatus 120 may include an exit plate assembly 150 forming an exit aperture through which the substrate 130 eventually exits the pressurization apparatus 120. The exit aperture of the exit plate assembly 150 may form a seal about the substrate 130 that allows the pressure in the pressurization chamber 310 to be controlled. In certain embodiments, the exit aperture is a two-dimensional profile of the substrate 130. In certain embodiments, the exit plate assembly 150 is configured to be removably attached to and removed from a wall of the pressurization apparatus 120. Accordingly, exit plate assemblies 150 having different profile exit apertures can be conveniently swapped in and out of place based on the profile of a substrate 130 to be coated.

In certain embodiments, the exit plate assembly 150 may form an adjustable seal about the substrate 130, which seal may be adjusted to help control the pressure level in the pressurization chamber 310. For example, the seal may be tightened to fit more snugly about the substrate profile. The tighter seal may allow a higher pressure level to be maintained in the pressurization chamber 310. Conversely, a looser seal may facilitate maintaining a lower pressure level in the pressurization chamber 310.

An adjustable exit seal may be provided in any suitable manner. For example, an exit seal tool having an exit aperture may be positioned between the exit plate assembly 150 and a wall of the pressurization apparatus 120. The exit seal tool may comprise a material (e.g., rubber) that allows the exit seal tool to change shape based on the pressure placed on the exit seal tool. For example, with the exit seal tool placed between the exit plate assembly 150 and a wall of the pressurization apparatus 120, the exit plate assembly 150 and the wall may be squeezed together, such as by tightening the exit plate assembly 150 to the wall, to tighten the seal. The exit seal tool may respond to the squeezing by encroaching into the exit aperture and thereby forming a tighter seal about the substrate 130. Conversely, the exit plate assembly 150 and the wall may be moved apart to loosen the seal. In other embodiments, an exit seal tool may be placed between two exit plates included in the exit plate assembly 150 and attached to a wall of the pressurization apparatus 120. The two exit plates may be squeezed together and/or moved apart to respectively tighten and/or loosen the seal.

In certain embodiments, the pressurization apparatus 120 may include one or more alignment mechanisms 160 for aligning the substrate 130 to pass through the exit aperture formed by the exit plate assembly 150. The alignment mechanisms 160 may be configured to align the substrate 130 vertically and/or horizontally in relation to the exit aperture. FIGS. 1 and 3 show exemplary alignment mechanisms 160, each of which includes an alignment roller positioned within the pressurization chamber 310. The position of the roller may be adjusted for guiding the substrate 130 through the exit aperture of the exit plate 150. In certain embodiments, the alignment roller may be adjusted inwardly toward and outwardly away from the substrate 130 in the pressurization chamber 310. Adjustments may be made in any suitable manner. In the example shown in FIGS. 1 and 3, each alignment mechanism 160 includes an adjustment control (e.g., knobs) positioned externally of the pressurization chamber 310. The adjustment control may be used (e.g., manually rotated by an operator) to adjust the position of the alignment roller within the pressurization chamber 310. The adjustable alignment mechanisms 160 may be especially helpful for configuring the apparatus 120 to accommodate various degrees of bowing in various substrate products (e.g., decorative moldings).

In certain embodiments, the pressurization apparatus 120 may include a quick-release top allowing for quick access to and/or sealing or unsealing of the pressurization chamber 310. The quick-release top may also provide convenient operator access inside the pressurization apparatus 120. As shown in FIG. 1, the pressurization apparatus 120 may include quick-release mechanisms 170 for use in quickly securing or removing the top of the pressurization apparatus 120. The exemplary quick-release mechanisms 170 and quick-release top are illustrative only.

Figure 4:
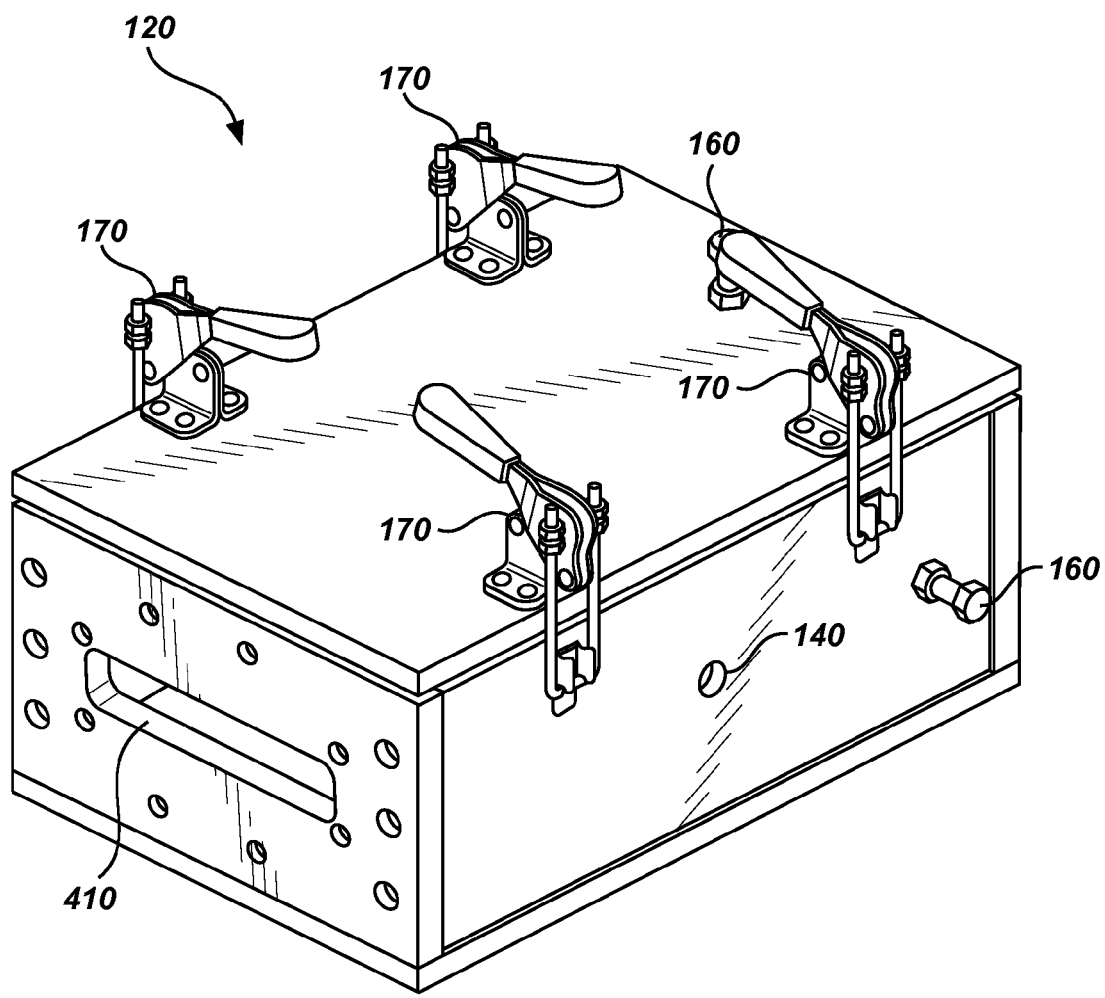
FIG. 4 is a perspective view of the pressurization apparatus included in the pressurization system of FIG. 1, according to principles described herein.
Figure 5:
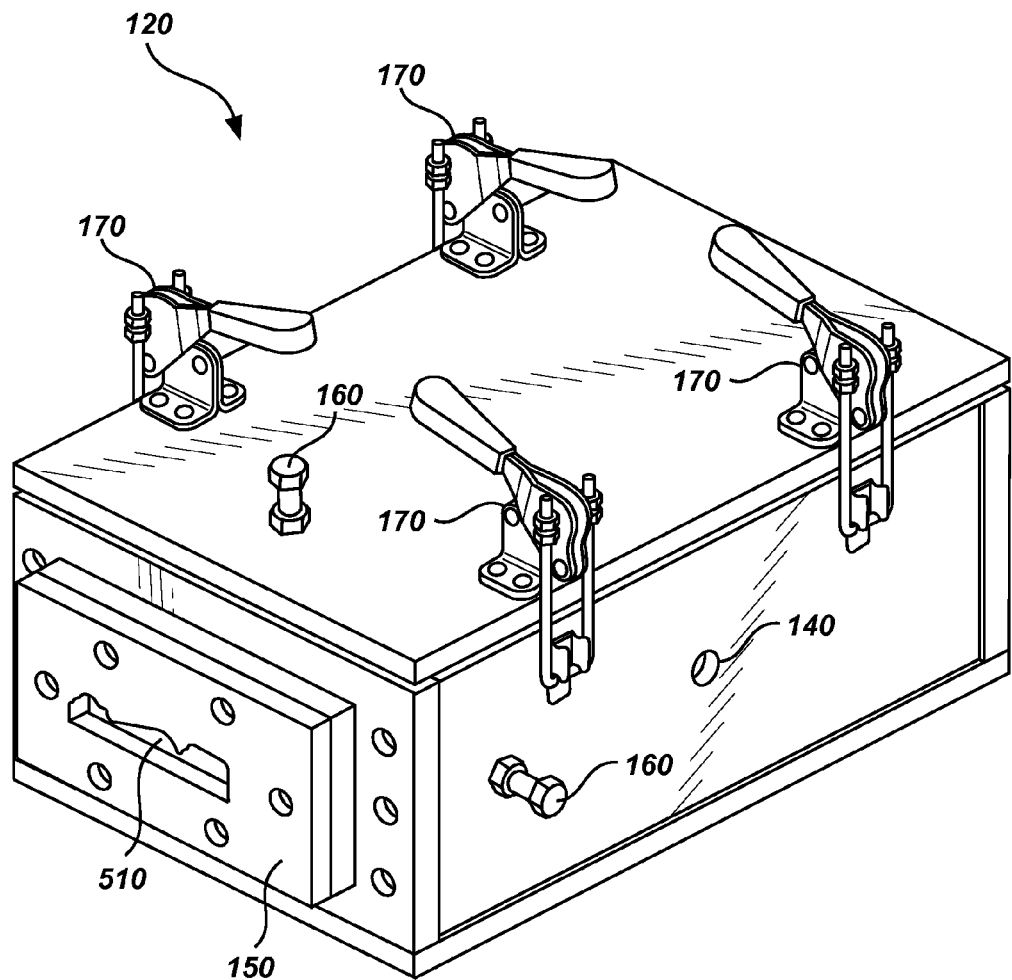
FIG. 5 is another perspective view of the pressurization apparatus included in the pressurization system of FIG. 1, according to principles described herein.

FIGS. 4 and 5 illustrate perspective views of the pressurization apparatus 120. FIG. 4 illustrates an end plate forming an entry aperture 410 through which the substrate 130 may enter the pressurization chamber 310 from the die tool 110. In the example of FIG. 4, the entry aperture 410 is configured to allow substrates 310 having various sizes, shapes, and profiles to pass through into the pressurization chamber 310. That is, the profile of the entry aperture 410 is not designed specifically for a particular substrate profile. Accordingly, various substrates 310 may enter the pressurization chamber 310 without having to swap out the end plate forming the entry aperture 410. As described above, the exit aperture of the die tool 110 may be configured to form a seal about the substrate 310 that can function as a seal for the pressurization chamber 310. Accordingly, the entry aperture 410 can be significantly larger than the profile of a substrate 130.

FIG. 5 illustrates an exemplary exit aperture 510 formed by the exit plate assembly 150. As shown, the exit aperture 510 may be configured to fit a specific substrate profile and to form a seal about the substrate 130.

Figure 6:
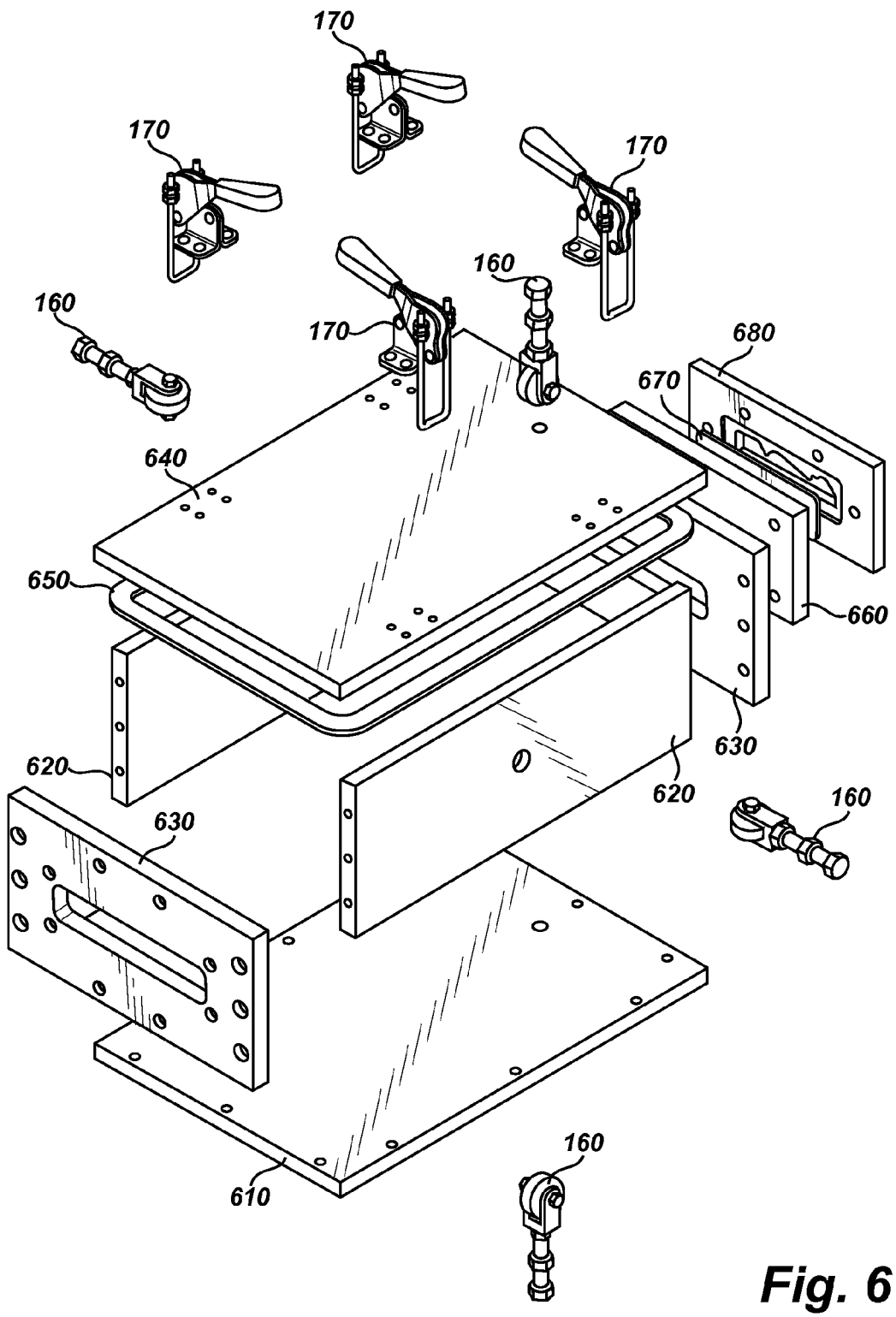
FIG. 6 is an exploded perspective view of the pressurization apparatus included in the pressurization system of FIG. 1, according to principles described herein.

FIG. 6 is an exploded perspective view of components of an exemplary pressurization apparatus 120. As shown in FIG. 6, the pressurization apparatus 120 may include a bottom plate 610, side plates 620, end plates 630, top plate 640, gasket 650, alignment exit plate 660, exit seal tool 670, exit plate 680, alignment mechanisms 160, and quick-release mechanisms 170. These components may be attached to one another in any way suitable to form the pressurization apparatus 120 shown in FIGS. 4 and 5. The components may be made of any suitable material, including metals, plastics, rubber, or combination or sub-combination thereof.

Figure 7:
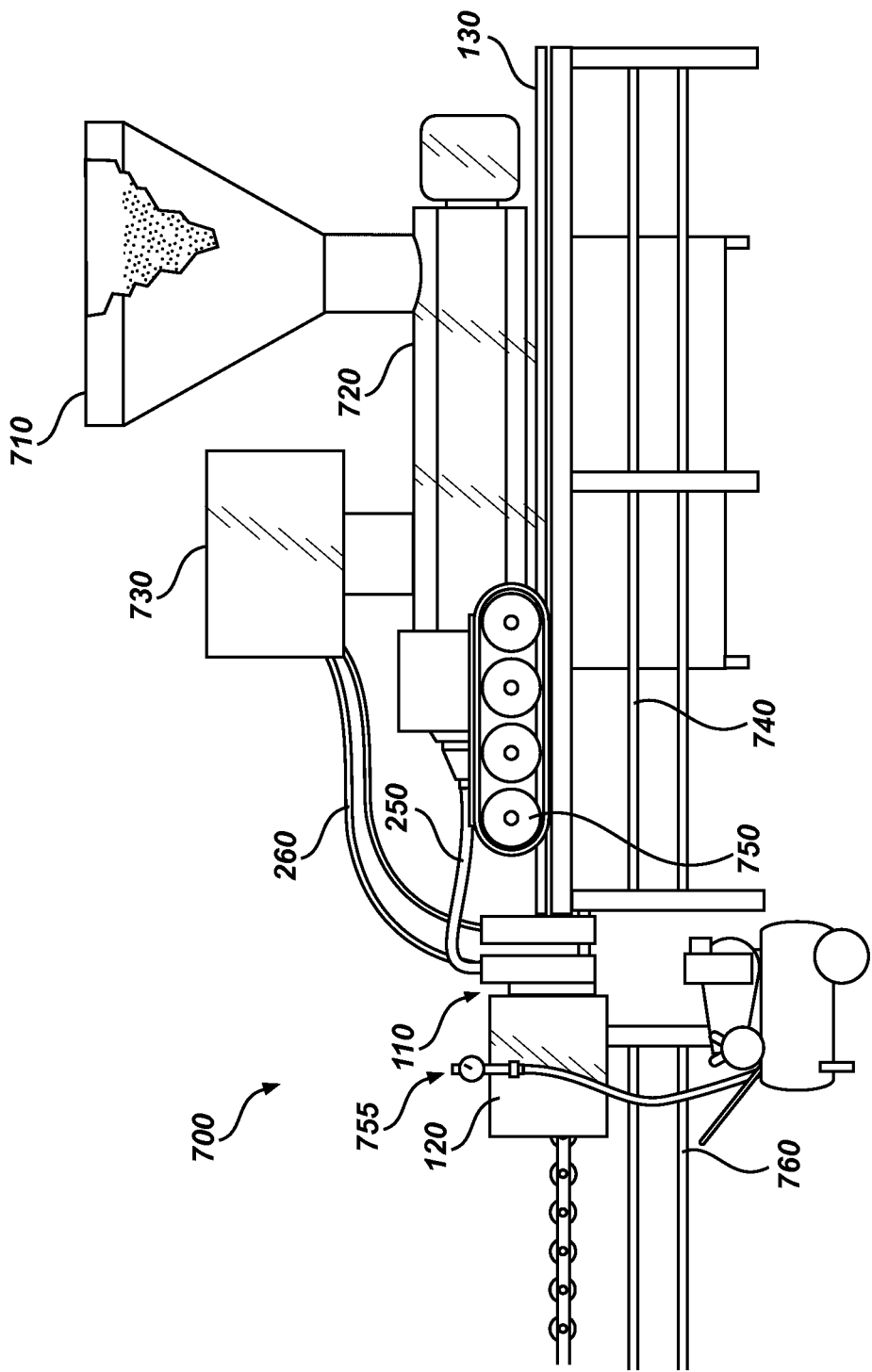
FIG. 7 illustrates another exemplary pressurization and coating system, according to principles described herein.

FIG. 7 illustrates an exemplary pressurization and coating system 700 including die tool 110 and pressurization apparatus 120 implemented therein. System 700 may include a coating material reservoir 710, a coating extruder 720, and die tool 110 attached to one another such that a coating material may travel from the reservoir 710 to the extruder 720 and to die tool 110 for application to the substrate 130 as the substrate 130 passes through the die tool 110.

System 700 may further include a heater 730 attached to the reservoir 710 and the extruder 720 and configured to heat the coating material to a fluid state. The coating material placed within reservoir 710 may be heated by heater 730 to a liquefied or fluid temperature state that allows the coating material to flow via a pump or by gravity to the extruder 720. As the coating material now is in a liquid or fluid state, it may travel to the coating chamber formed within the die tool 110 via the coating material feed 250. In certain embodiments, the coating material may surround the perimeter of the exit aperture 240 in the die tool 110. Once a sufficient amount of coating material collects within the coating chamber and along the perimeter of the exit aperture 240, the coating material is ready to be applied to the substrate 130 as the substrate 130 passes through the die tool 110.

System 700 may further include a feeder assembly 740, which may be configured to feed the substrate 130 to be processed and coated during operation. The feeder assembly 740 may include any suitable mechanisms(s) configured to feed a substrate 130 through the die tool 110 and the pressurization apparatus 120, including a motorized belt drive 750 pressed against the substrate 130 and configured to control the delivery rate of the substrate 130 through the die tool 110 and the pressurization apparatus 120. As the substrate 130 passes through the die tool 110, a coating material is applied directly to the surface of the substrate 130 in a controlled manner or within the tolerances allowed by the die tool 110 relative to the substrate surface.

When the substrate 130 exits the die tool 110 and enters the pressurization chamber 310 in the pressurization apparatus 120, the controlled pressure within the chamber 310 may function to reduce or eliminate moisture steam off, as described above. Pressurization tools 755 (e.g., an air compressor, air hose, and gauge) may be attached to pressurization apparatus 120 and used to provide air and/or other gases to the pressurization apparatus 120 to produce and monitor the controlled pressure environment in the pressurization chamber 310. An exit assembly 760 may receive the substrate 130 after the substrate has passed through the die tool 110 and the pressurization apparatus 120.

Examples of products that may be coated using the pressurization and coating systems, apparatuses, methods, and principles described herein include, but are in no way limited to, base and crown molding for residential and commercial construction, trim work for interior and exterior applications, decorative finish carpentry products, picture frame surfaces, window coverings (e.g., blinds and shutters), metal trim and finish work, planks (e.g., 4'×8' panels), and siding (e.g., metal and vinyl siding). These examples are illustrative only and not limiting in any sense. Other products may be coated in other embodiments and applications.

Figure 8:
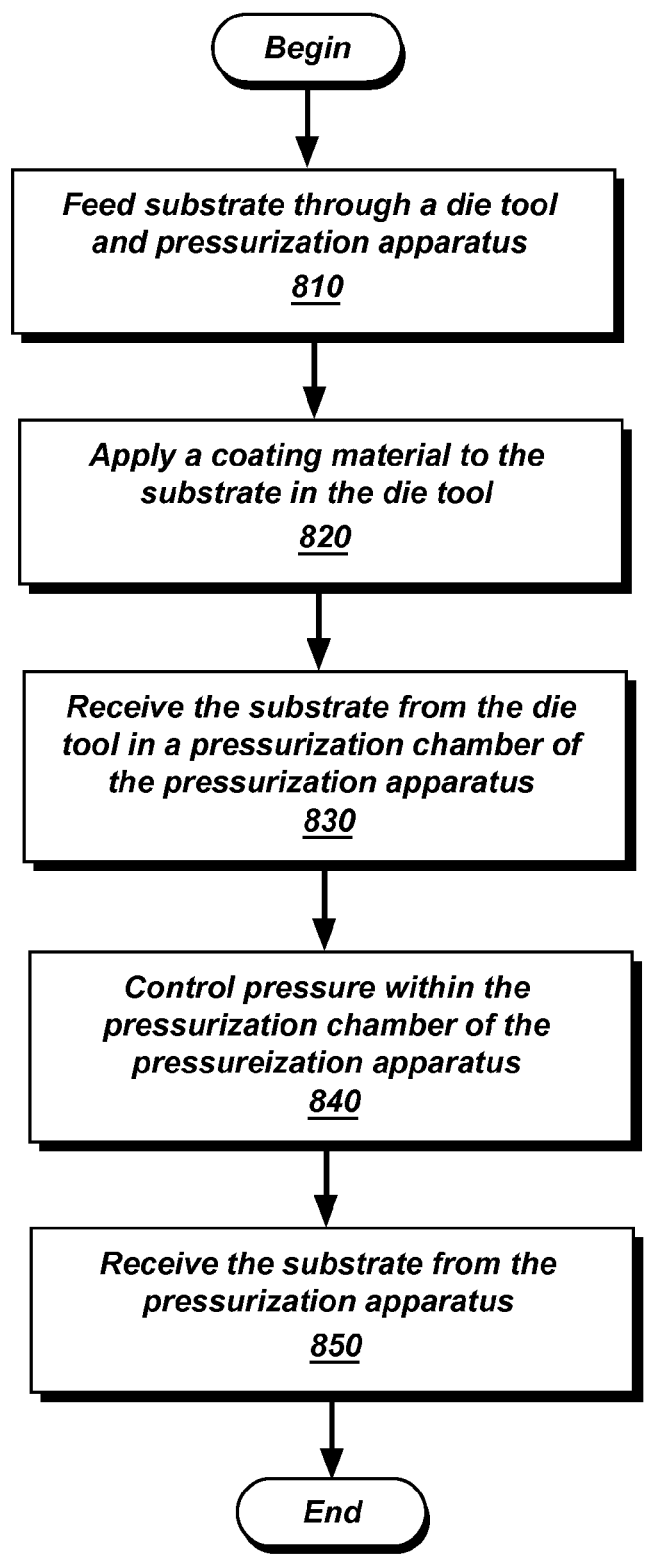
FIG. 8 illustrates an exemplary pressurization and coating method, according to principles described herein.

FIG. 8 illustrates an exemplary pressurization coating method. While FIG. 8 illustrates exemplary steps according to one embodiment, other embodiments may omit, add to, reorder, and/or modify any of the steps shown in FIG. 8.

In step 810, a substrate 130 is fed through the die tool 110 and the pressurization apparatus 120. Step 810 may be performed in any way described above, including using feeder assembly 740 to feed the substrate 130.

In step 820, a coating material is applied to the substrate 130. Step 820 may be performed in any way described above, including pre-treating (e.g., heating) the coating material, providing the coating material to the die tool 110, and applying the coating material to the substrate 130 as the substrate 130 is fed through the die tool 110.

In step 830, the substrate 130 is received in the pressurization chamber 310 of the pressurization apparatus 120. Step 830 may be performed in any way described above, including receiving the substrate 130 directly from the die tool 110.

In step 840, pressure about the substrate 130 in the pressurization chamber 310 is controlled. Step 840 may be performed in any of the ways described above, including controlling an air pressure level within the pressurization chamber 310. The pressure may be set to and/or maintained at a pressure level that may serve a particular embodiment and/or coating application. In certain applications, the pressure level is maintained at a level between a pressure level in the die tool 110 and atmospheric pressure. The controlled pressure within the pressurization chamber 310 may to set to reduce or eliminate "steam off" of moisture from the substrate 130, as described above.

In step 850, the substrate 130 is received from the pressurization chamber 310. Step 850 may be performed in any way described herein, including the exit assembly 760 receiving the substrate 130 as it exits from the pressurization apparatus 120.

The pressurization systems, methods, and apparatuses described herein may be employed in a variety of coating processes using various coating materials and various substrate materials in a manner that can eliminate or at least reduce "steam off" and/or other flash events that may otherwise be introduced by volatile materials in the substrates. Examples of such volatile materials include, but are not limited to, moisture or any other material that may react undesirably when subjected to a sudden change in environmental temperature and/or pressure. Volatiles may be naturally or synthetically included in substrate materials. As one example, water moisture in woods, plastics, metals, and other materials may be considered to be volatile when subjected to a sudden decrease in environmental temperature and/or pressure. The principles described herein may be employed to eliminate or at least reduce the amount of "steam offs" or other flash events that may otherwise occur in such products.

Volatiles may also be present or introduced in coating materials. The principles described herein may be employed in coating processes to eliminate or at least reduce "steam off" and/or other flash events that may otherwise be introduced by volatile materials in the coating materials. Accordingly, the principles described herein may be employed in coating processes to protect substrates and/or coating materials from unwanted flash events.

The principles described herein may be employed to protect materials that do not normally include volatile materials. As an example, a certain plastic substrate or coating material may not normally include moisture, but manufacturing processes may inadvertently introduce moisture into such a plastic substrate or coating material. When employed, the principles described herein may protect the plastic substrate or coating material from experiencing a flash event due to unsuspected moisture included therein. Accordingly, the principles described herein may be employed in a wide variety of coating processes to protect a variety of materials against flashing events that may otherwise be caused by any of a number of volatiles in the materials.

The preceding description has been presented only to illustrate and describe exemplary embodiments with reference to the accompanying drawings. It will, however, be evident that various modifications and changes may be made thereto, and additional embodiments may be implemented, without departing from the scope of the invention as set forth in the claims that follow. The above description and accompanying drawings are accordingly to be regarded in an illustrative rather than a restrictive sense.

What is claimed is:

1. A system, comprising:
a die tool configured to apply a coating material to a substrate passing through the die tool;
a pressurization apparatus attached to the die tool, the pressurization apparatus forming a pressurization chamber; and
an adjustable exit seal on the pressurization apparatus,
wherein an exit aperture of the exit seal is asymmetrical in shape,
wherein the adjustable exit seal comprises a material that is disposed between an exit plate assembly and a portion of the pressurization apparatus such that the exit plate assembly is configured to at least one of tighten and loosen with respect to the portion of the pressurization apparatus to change a size of the asymmetrical exit aperture,
wherein the pressurization apparatus is configured to receive the substrate from the die tool and control pressure about the substrate in the pressurization chamber, and
wherein the pressurization chamber is configured to prevent moisture in at least one of the substrate and the coating material from steaming off and deforming the coating material as the substrate is passed from the pressurization chamber to ambient pressure.

2. The system of claim 1, wherein the die tool forms a coating chamber and is configured to apply the coating material on at least one surface of the substrate in the coating chamber.

3. The system of claim 2, wherein the pressurization apparatus is configured to maintain the pressure in the pressurization chamber at a level between atmospheric pressure and a pressure in the coating chamber.

4. The system of claim 1, wherein the pressure comprises air pressure and the pressurization apparatus is configured to control the air pressure about the substrate in the pressurization chamber.

5. The system of claim 1, wherein the pressurization apparatus is attached to the die tool such that an air pressure seal is formed between the pressurization apparatus and the die tool.

6. The system of claim 1, wherein the die tool comprises a first side and a second side, wherein the first side of the die tool is configured to receive the substrate directly from ambient air at ambient pressure, and wherein the pressurization apparatus is coupled to the second side of the die tool.

7. The system of claim 1, wherein the system is configured to cool the substrate in the pressurization chamber to prevent the moisture in the at least one of the substrate and the coating material from steaming off and deforming the coating material as the substrate is passed from the pressurization chamber to ambient pressure.

8. The system of claim 1, wherein a portion of the pressurization chamber through which the substrate passes is openable to allow for operator access into the pressurization chamber.

9. The system of claim 1, wherein the asymmetrical exit aperture is asymmetrical with respect to any plane passing through the exit aperture.

10. The system of claim 1, wherein the pressurization apparatus comprises a device configured to align the substrate with the exit aperture, and wherein a portion of the device extends through a wall of the pressurization apparatus, and wherein a substrate contact surface on the device is configured to contact and align the substrate within the pressurization chamber.

11. The system of claim 10, wherein the substrate contact surface comprises a roller that is disposed within the pressurization chamber and wherein an adjustment control is physically connected to the roller but is disposed external to the pressurization chamber, and wherein the adjustment control is configured to be rotated to adjust a position of the roller within the pressurization chamber.

12. The system of claim 1, further comprising:
a coating material reservoir configured to hold the coating material;
a heater configured to heat the coating material to a liquefied state; and
an extruder and a coating material feed configured to provide the liquefied coating material to the die tool for application to the substrate.

13. The system of claim 12, further comprising a feeder assembly configured to feed the substrate through the die tool and the pressurization chamber.

14. The system of claim 1, wherein the pressurization apparatus is configured to maintain the pressure in the pressurization chamber at a level between approximately five and eighty pounds per square inch (5-80 psi).

15. The system of claim 1, wherein the substrate includes a piece of molding comprising wood.

16. The system of claim 1, wherein the substrate includes a product comprising wood.

17. A system comprising:
a die tool forming a coating chamber and configured to apply a coating material to a substrate passing through the coating chamber;
a coating material reservoir configured to hold the coating material;
a heater configured to heat the coating material;
an extruder and a coating material feed configured to provide the coating material to the die tool for application to the substrate in the coating chamber;
a pressurization apparatus attached to the die tool, the pressurization apparatus forming a pressurization chamber;
a feeder assembly configured to feed the substrate through the die tool and the pressurization chamber; and
an adjustable exit seal disposed on the pressurization apparatus,
wherein an exit aperture of the exit seal is asymmetrical in shape,
wherein the exit seal comprises a material disposed between two objects such that the asymmetrical exit aperture of the exit seal is configured to adjust in size as the two objects are tightened together, and
wherein the pressurization apparatus is configured to receive the coated substrate directly from the die tool and control air pressure about the coated substrate in the pressurization chamber.

18. A method comprising:
feeding a substrate through a die tool configured to apply a coating material to a substrate passing through the die tool and a pressurization apparatus attached to the die tool, the pressurization apparatus forming a pressurization chamber, wherein the pressurization apparatus is configured to receive the substrate from the die tool and control pressure about the substrate in the pressurization chamber, wherein the pressurization apparatus comprises an exit seal defining an asymmetrical exit aperture, wherein the exit seal comprises a material that is disposed between two objects such that the asymmetrical exit aperture of the exit seal is configured to adjust in size as the two objects are tightened together, and wherein the pressurization chamber is configured to prevent moisture in at least one of the substrate and the coating material from steaming off as the substrate is passed from the pressurization chamber to ambient pressure;
applying a coating material to at least one surface of the substrate in the die tool;
receiving the substrate from the die tool into the pressurization apparatus; and
controlling pressure about the substrate within the pressurization apparatus.

19. The method of claim 18, wherein the substrate comprises wood.

20. The method of claim 19, wherein the die tool forms a coating chamber, and wherein the controlling of the pressure includes maintaining the pressure at a level between the ambient pressure and a pressure within the coating chamber.

21. A system, comprising:
a die tool configured to apply a coating material to a substrate passing through the die tool;
a pressurization apparatus attached to the die tool, the pressurization apparatus forming a pressurization chamber; and
an adjustable exit seal disposed on the pressurization apparatus,
wherein an exit aperture of the adjustable exit seal is asymmetrical in shape,
wherein the exit seal comprises a material that is disposed between two objects such that the asymmetrical exit aperture of the exit seal is configured to adjust in size as the two objects are at least one of tightened together and loosened with respect to each other,
wherein the pressurization apparatus is configured to receive the substrate from the die tool and control pressure about the substrate in the pressurization chamber,
wherein the pressurization chamber is configured to prevent moisture in the substrate from steaming off as the substrate is passed from the pressurization chamber to ambient pressure, and
wherein the pressurization apparatus comprises an entry aperture that is larger than a profile of the substrate.

* * * * *